US008428669B2

(12) United States Patent  
Yamamoto

(10) Patent No.: US 8,428,669 B2  
(45) Date of Patent: Apr. 23, 2013

(54) PORTABLE TERMINAL DEVICE

(75) Inventor: Issei Yamamoto, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/056,289

(22) PCT Filed: Jul. 28, 2009

(86) PCT No.: PCT/JP2009/063433  
§ 371 (c)(1),  
(2), (4) Date: Jan. 27, 2011

(87) PCT Pub. No.: WO2010/013715  
PCT Pub. Date: Feb. 4, 2010

(65) Prior Publication Data  
US 2011/0124369 A1 May 26, 2011

(30) Foreign Application Priority Data  
Jul. 29, 2008 (JP) ................................. 2008-195519

(51) Int. Cl.  
*H04M 1/00* (2006.01)

(52) U.S. Cl.  
USPC .................. 455/575.4; 455/575.1; 455/575.9

(58) Field of Classification Search .......................... None  
See application file for complete search history.

(56) References Cited

U.S. PATENT DOCUMENTS

| 7,430,439 | B2 * | 9/2008 | Griffin et al. ............... 455/552.1 |
| 7,702,282 | B2 * | 4/2010 | Sandegard et al. .......... 455/41.2 |
| 7,735,025 | B2 * | 6/2010 | Lee et al. ..................... 715/863 |
| 2003/0217070 | A1 * | 11/2003 | Gotoh et al. ................. 707/102 |
| 2006/0125782 | A1 * | 6/2006 | Orchard et al. .............. 345/156 |
| 2006/0255139 | A1 | 11/2006 | Lee et al. |
| 2007/0259685 | A1 * | 11/2007 | Engblom et al. .......... 455/550.1 |
| 2008/0174550 | A1 * | 7/2008 | Laurila et al. .............. 345/158 |
| 2008/0214160 | A1 * | 9/2008 | Jonsson ..................... 455/414.2 |

FOREIGN PATENT DOCUMENTS

JP  2001-144853 A  5/2001

(Continued)

OTHER PUBLICATIONS

International Search Report and Written Opinion dated Sep. 1, 2009 issued by the Japanese Patent Office for International Application No. PCT/JP2009/063433.

Written Opinion of the International Searching Authority dated Sep. 1, 2009 for International Application No. PCT/JP2009/063433.

(Continued)

*Primary Examiner* — Kamran Afshar  
*Assistant Examiner* — Sayed T Zewari  
(74) *Attorney, Agent, or Firm* — Procopio, Cory, Hargreaves & Savitch LLP

(57) ABSTRACT

[Object]  
To provide a portable terminal device accepting an input operation in accordance with acceleration, which is less prone to cause incorrect input and allows a user to perform easily an input operation.  
[Constitution]  
A mobile phone includes an acceleration sensor 13 for detecting acceleration produced on a mobile phone main body; a cumulative value calculating section 100a for calculating a cumulative value of detected acceleration; a comparing section 100b for comparing the cumulative value with a threshold value; and a CPU 100 for controlling a security lock mode in accordance with a result of comparison by the comparing section 100b. When the cumulative value has exceeded the threshold value by a user shaking the mobile phone, the CPU 100 cancels the security lock mode.

7 Claims, 12 Drawing Sheets

FOREIGN PATENT DOCUMENTS

| | | |
|---|---|---|
| JP | 2002-330210 A | 11/2002 |
| JP | 2002-354097 A | 12/2002 |
| JP | 2003-163742 A | 6/2003 |
| JP | 2004-254337 A | 9/2004 |
| JP | 2005-094334 A | 4/2005 |
| JP | 2005-165850 A | 6/2005 |
| JP | 2005-347848 A | 12/2005 |
| JP | 2007-116318 A | 5/2007 |
| JP | 2008-078763 A | 4/2008 |
| JP | 2009-109336 A | 5/2009 |

OTHER PUBLICATIONS

Office Action dated Mar. 22, 2012, issued in counterpart Korean Application No. 10-2011-7004539.

Notification of Reasons for Refusal dated Sep. 4, 2012 issued in counterpart Japanese Application No. 2008-195519.

Notification of Reasons for Refusal dated Dec. 25, 2012, issued in counterpart Japanese Application No. 2008-195519.

* cited by examiner

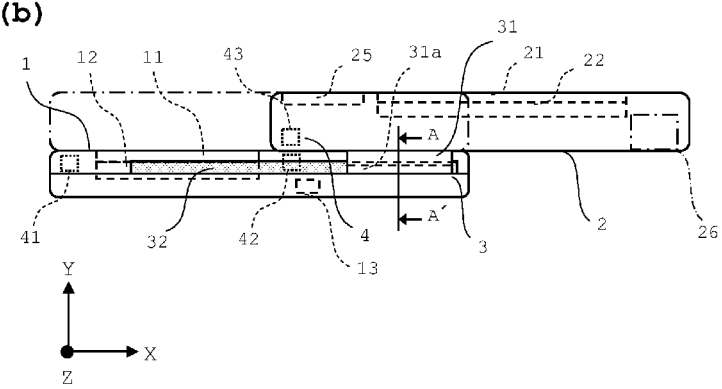
[FIG.1]

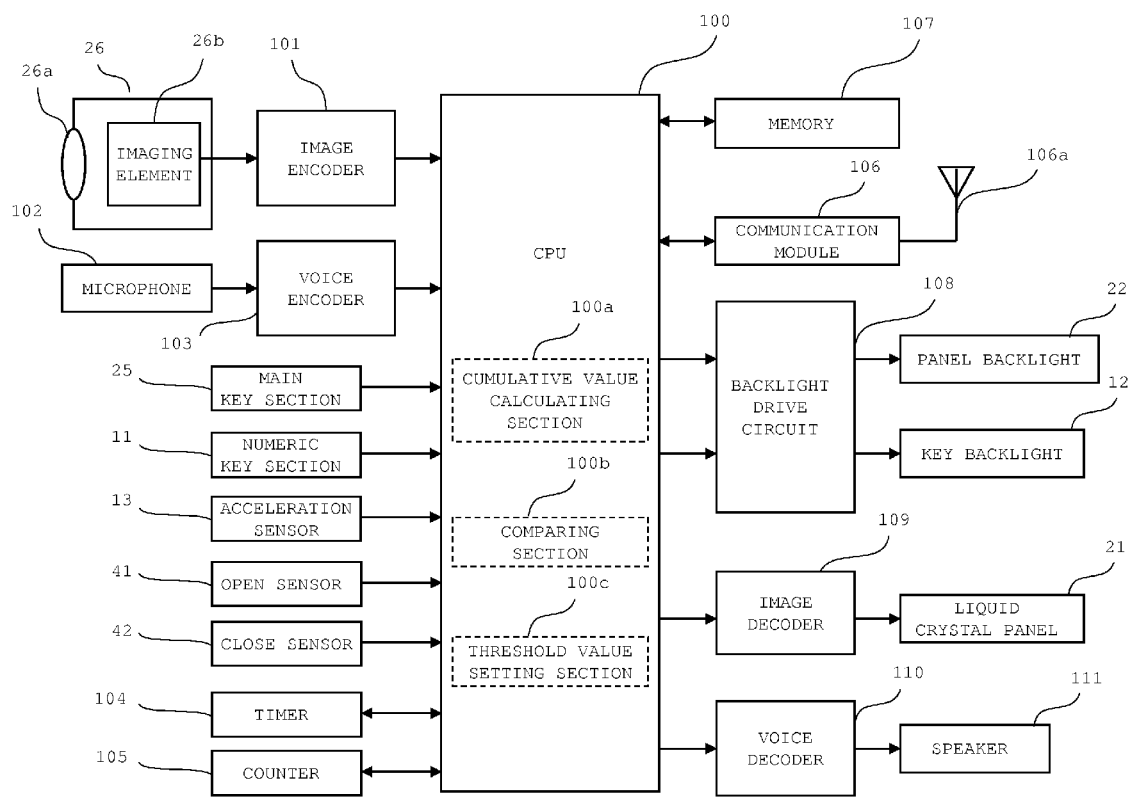
[FIG.2]

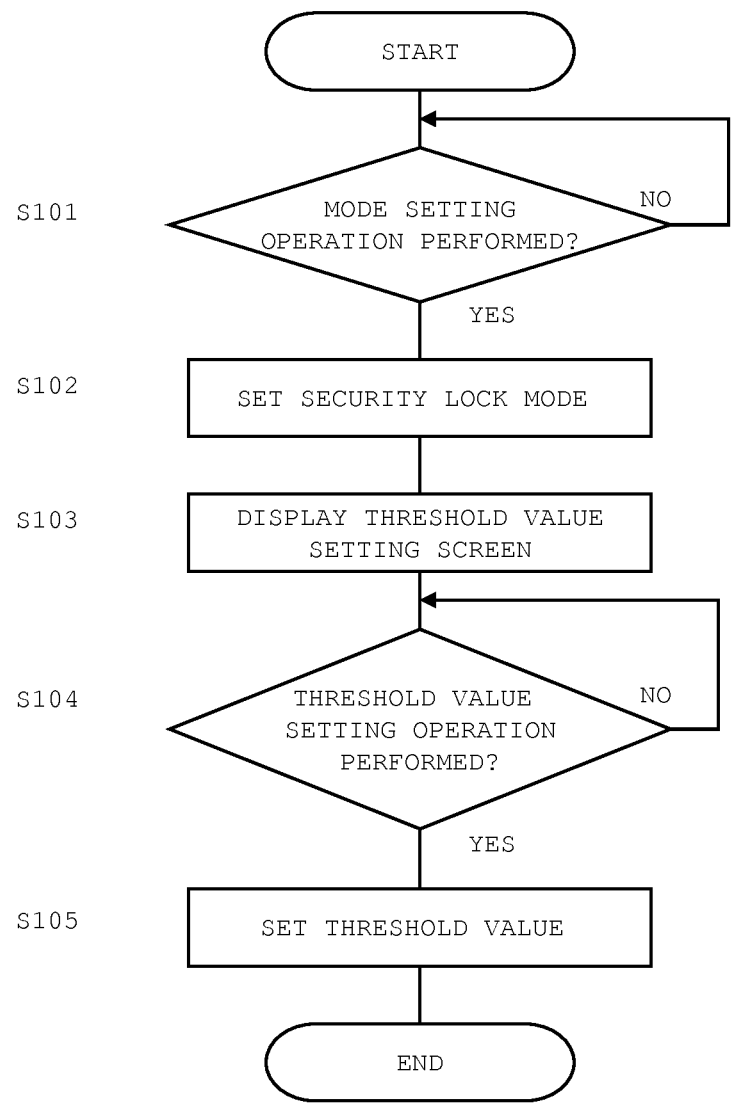
[FIG.3]

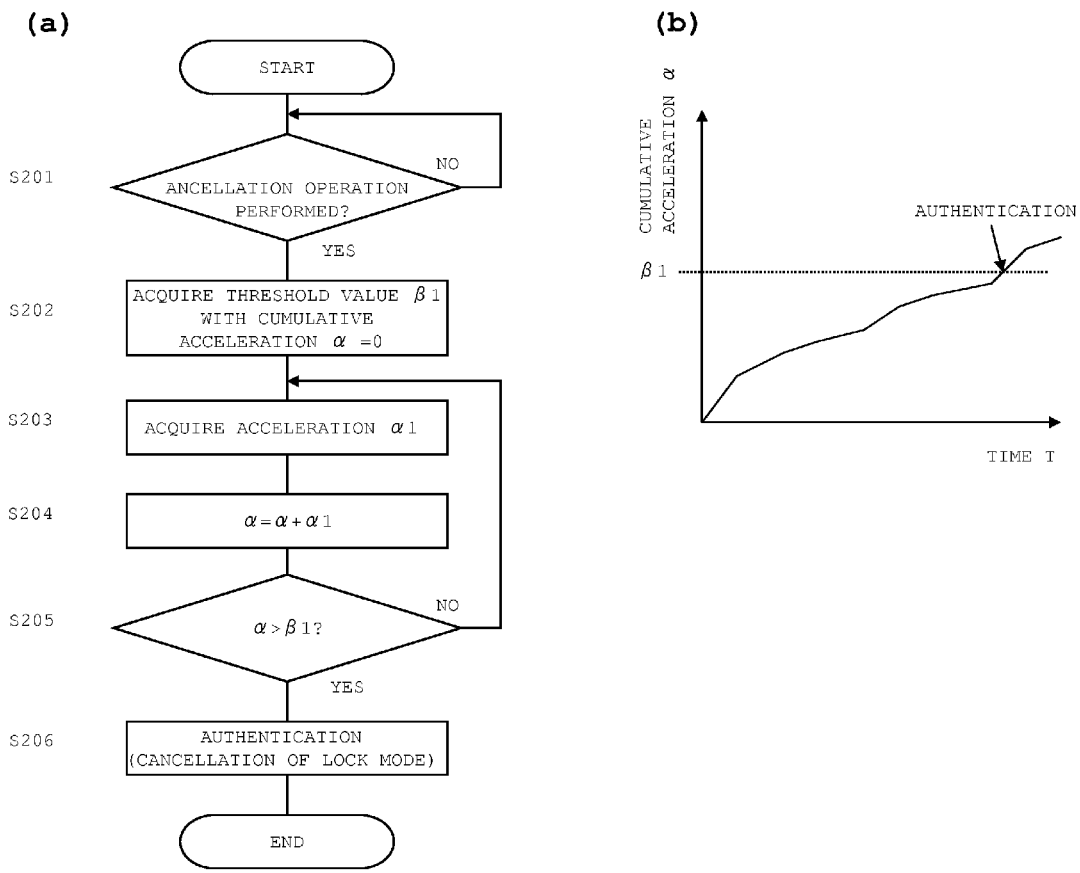
[FIG.4]

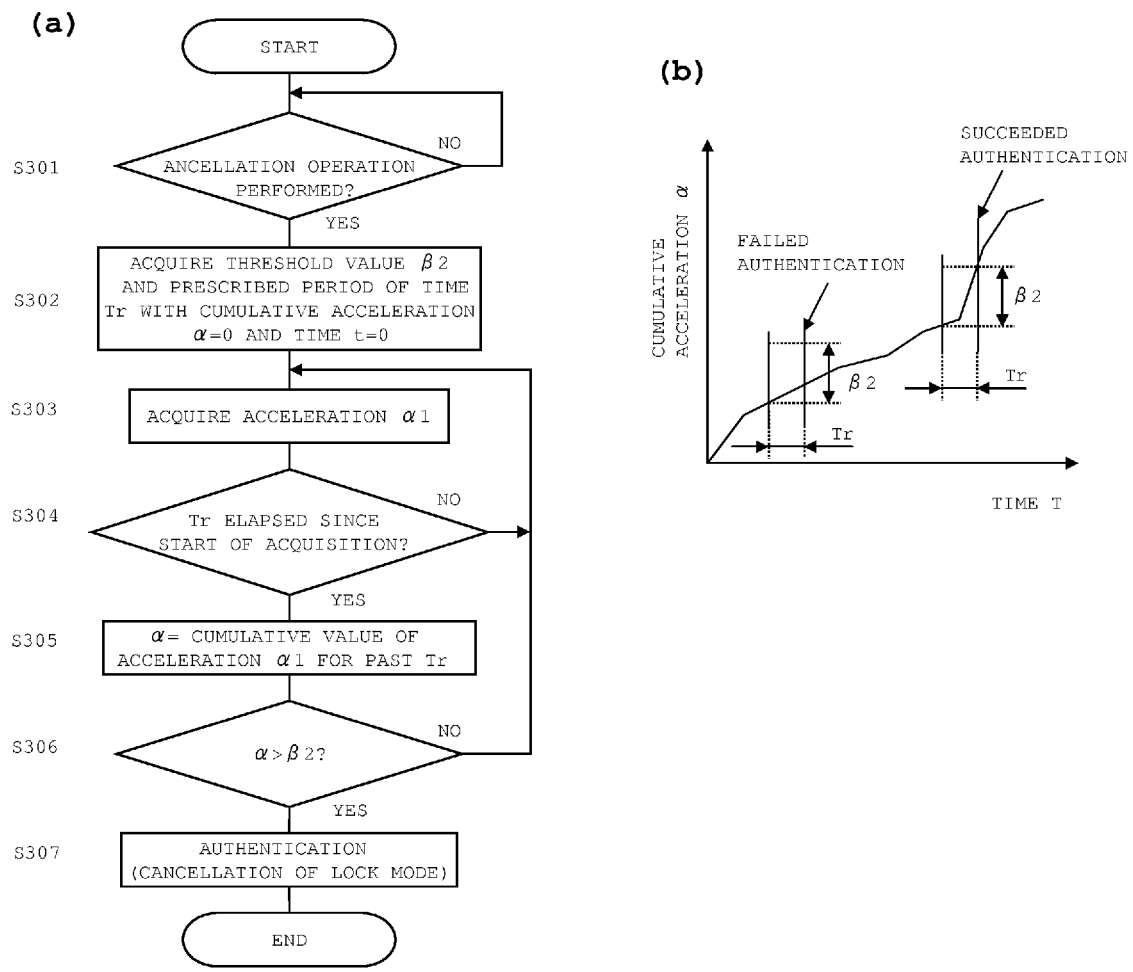
[FIG.5]

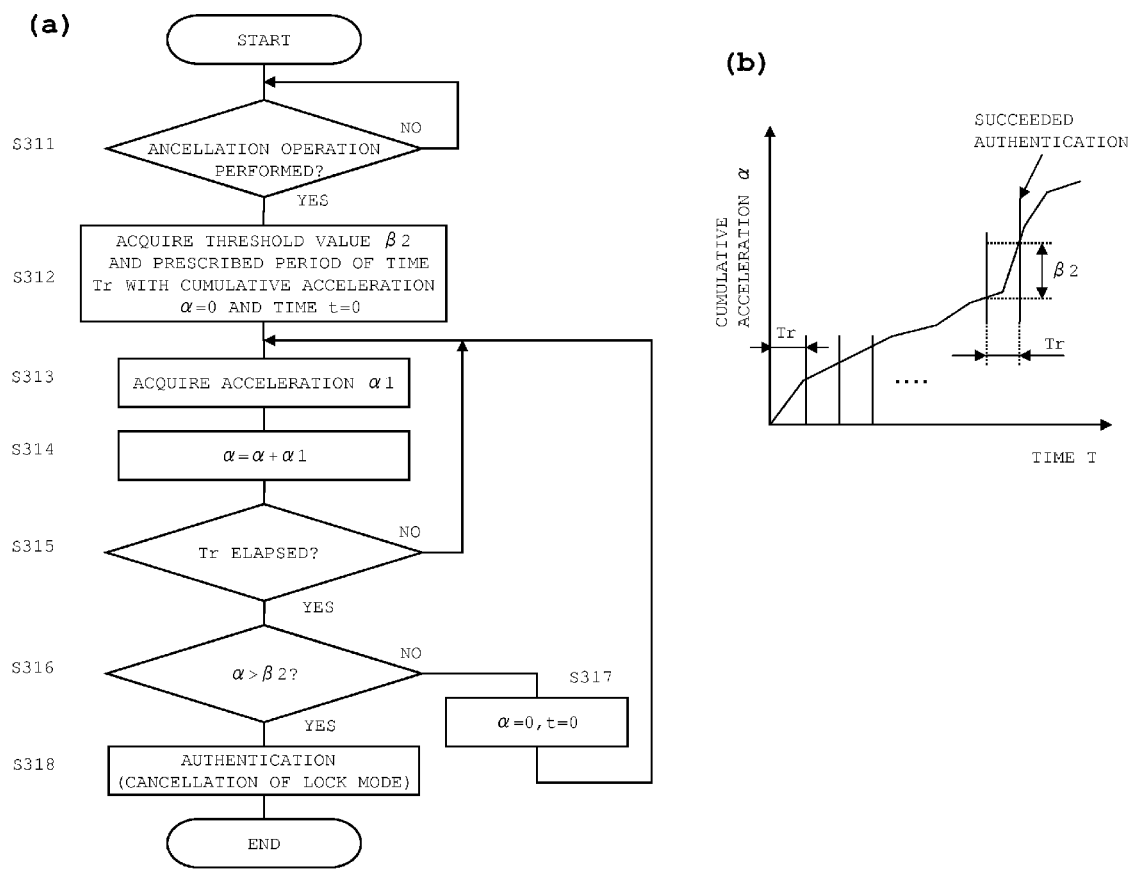
[FIG. 6]

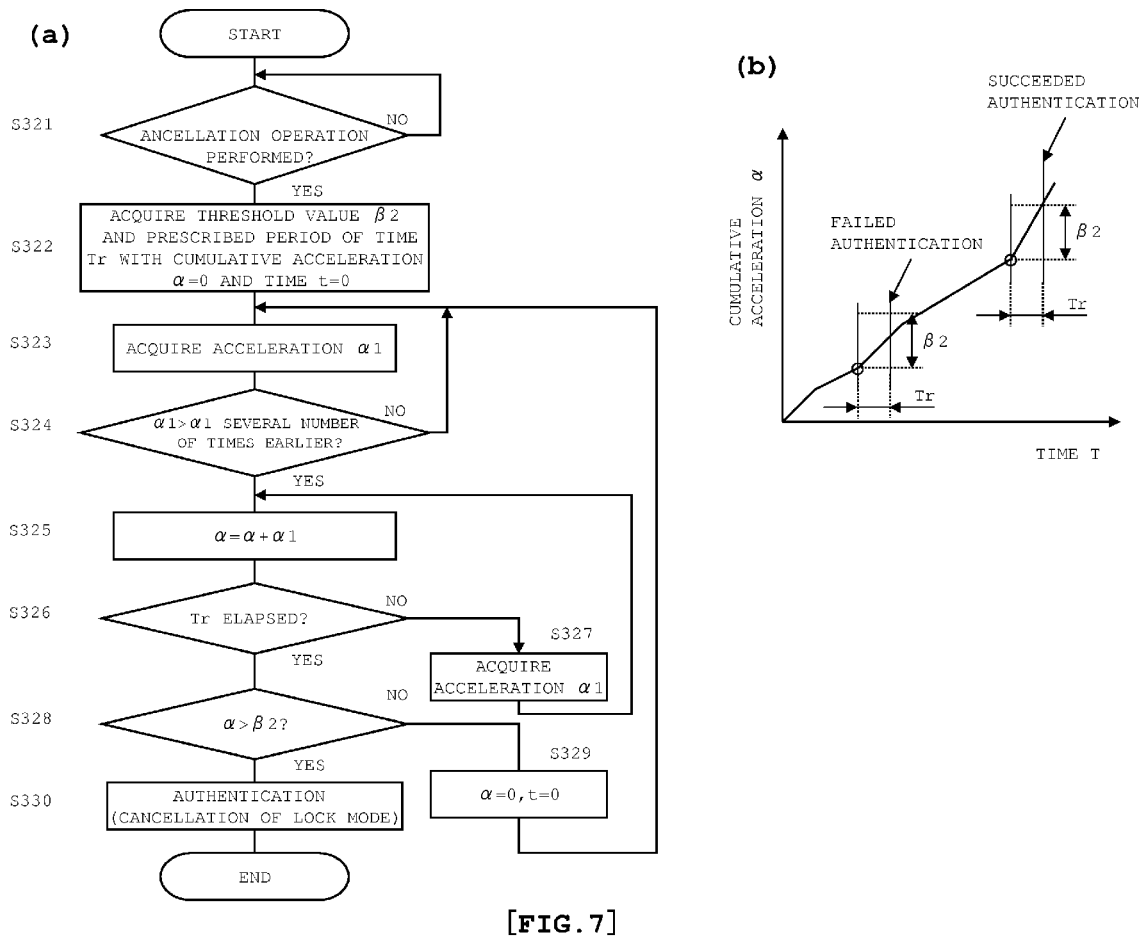
[FIG. 7]

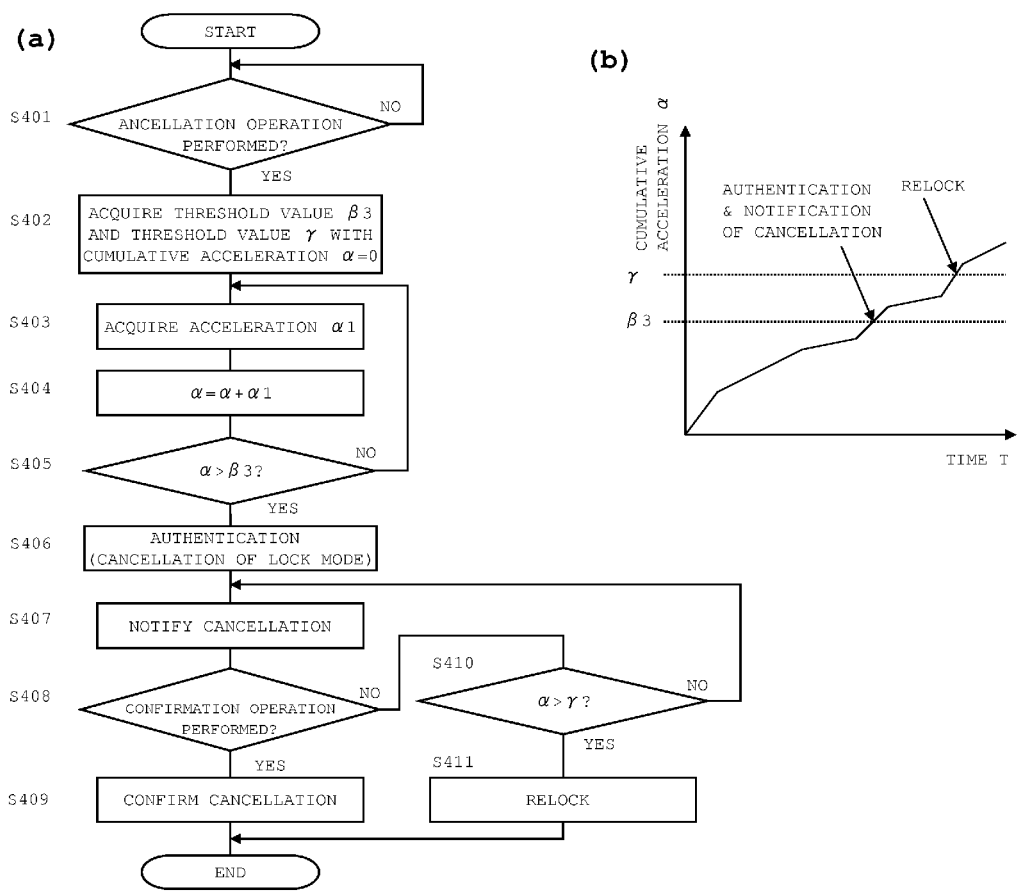
[FIG.8]

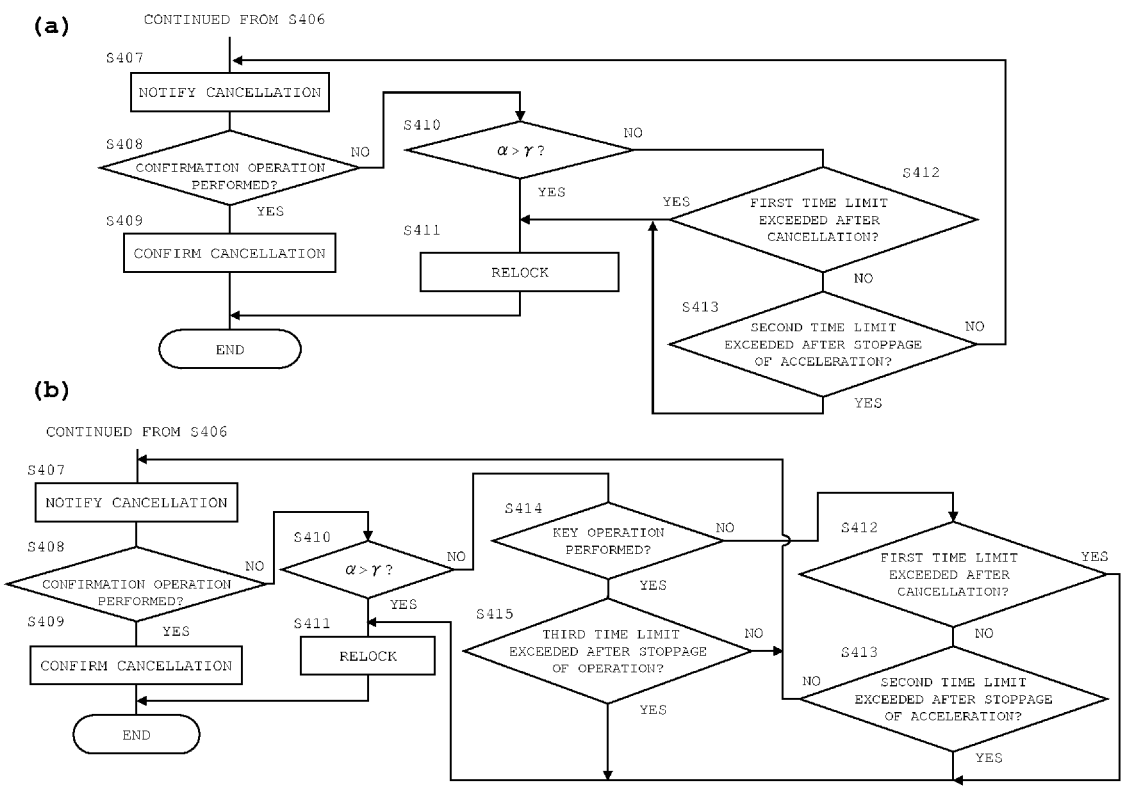
[FIG. 9]

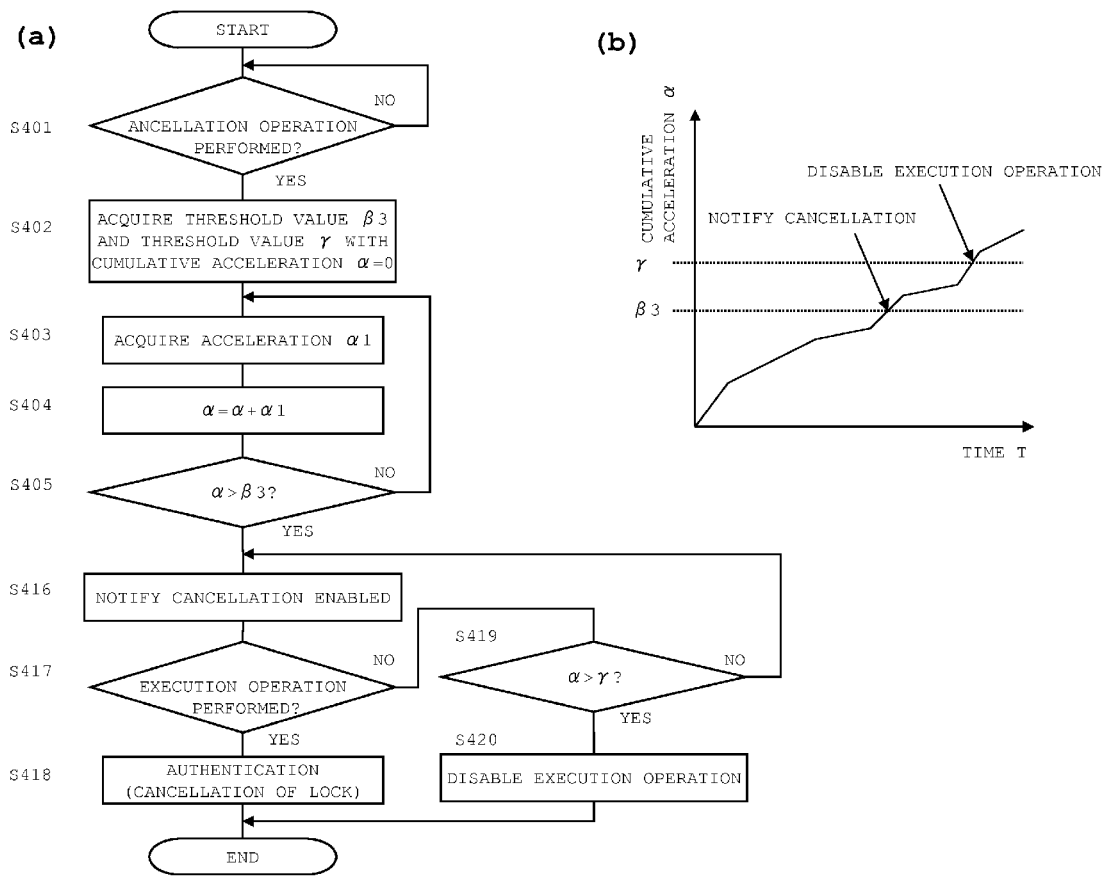
[FIG.10]

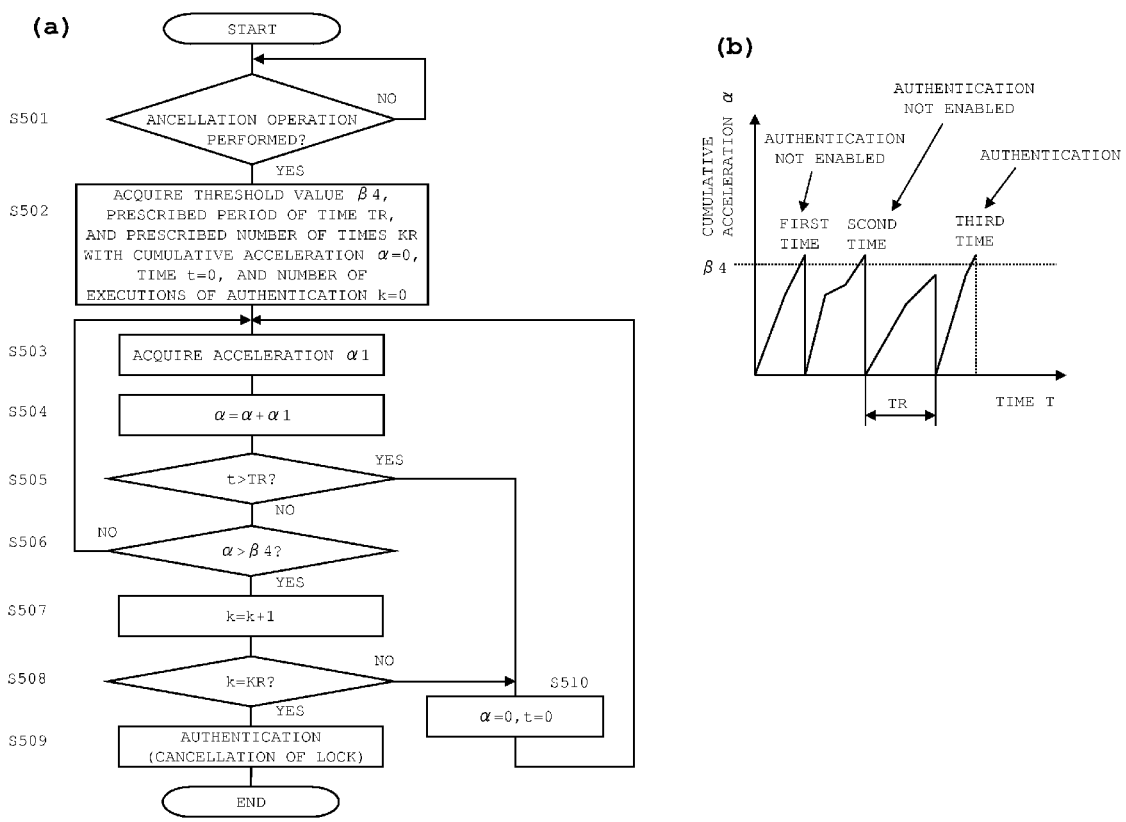
[FIG.11]

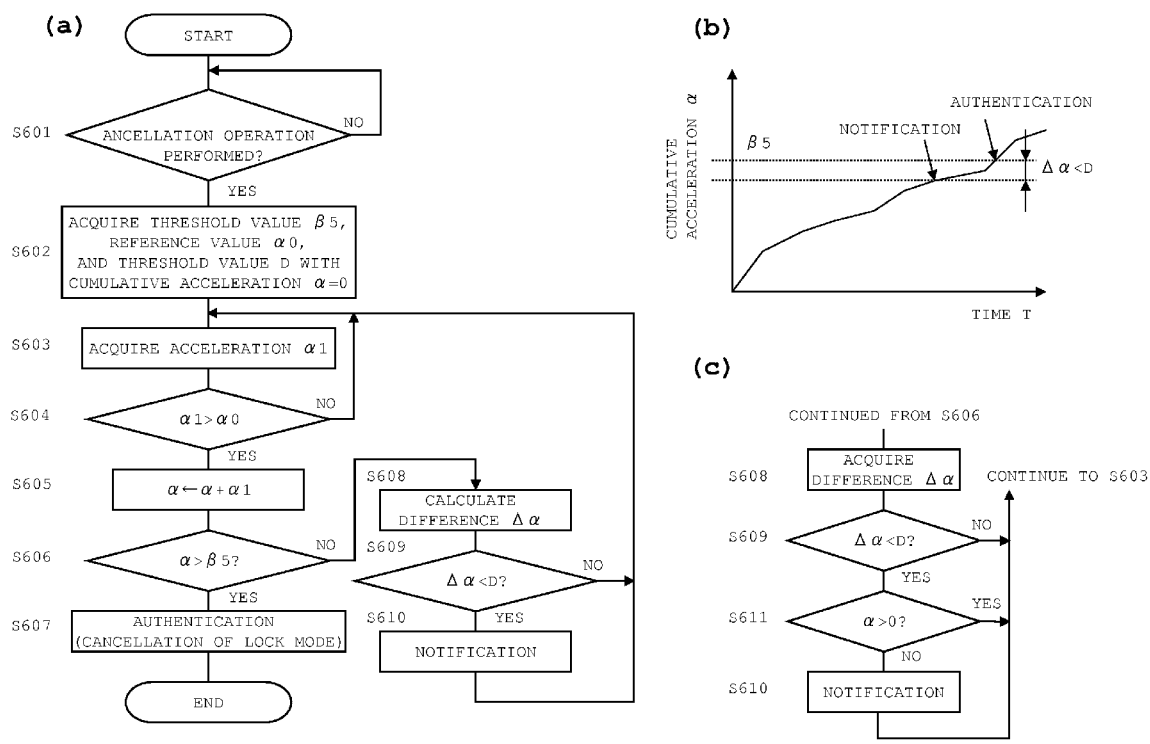
[FIG.12]

PORTABLE TERMINAL DEVICE

TECHNICAL FIELD

The present invention relates to portable terminal devices such as mobile phones and personal digital assistants (PDAs).

BACKGROUND ART

In recent years, portable terminal devices such as mobile phones have been equipped increasingly with various advanced features such as a mail function, a camera function, and also a television function. With such an increased number of functions, the portable terminal devices have required more input operations.

However, the number of operation keys is restricted because of space limitations. Accordingly, a user needs to press keys many times even for execution of one function. Therefore, there are concerns about operability deterioration on this kind of portable terminal devices.

Operability deterioration can be suppressed by disposing an input means other than operation keys. For example, an acceleration sensor may be used as another input means. In this case, the acceleration sensor is built into the main body of the portable terminal device. When the acceleration sensor detects any movement of the portable terminal device's main body, a predetermined command is issued in accordance with the movement.

For example, when a user moves the portable terminal device to draw a character for authentication in the air, the drawn character is recognized based on changes in acceleration. Then, if a result of the recognition matches a pre-registered character, the portable terminal device executes a function such as cancellation of a security lock mode (for disabling key operations).

DISCLOSURE OF THE INVENTION

Problem to be Solved by the Invention

In such an arrangement, acceleration may be detected even when a user unintentionally moves the portable terminal device. For example, when a user carries the portable terminal device in a bag and the device is shaken, acceleration in the device may be detected. Accordingly, using simply the value of acceleration may cause a situation where spontaneous shakes or the like of the portable terminal device match predetermined input conditions. In this case, incorrect input is performed on the portable terminal device.

Meanwhile, incorrect input is less prone to take place in such an arrangement as described above where subtle changes in acceleration are detected, as in the case of character recognition with changes in acceleration. On the other hand, however, a user is required to produce subtle movements of the portable terminal device. Therefore, if created movements of the portable terminal device deviate from prescribed movements, a desired input operation cannot be accepted.

The present invention is devised to solve such problems, and therefore an object of the present invention is to provide a portable terminal device accepting an input operation in accordance with acceleration, which is less prone to cause incorrect input and allows a user to perform easily an input operation.

Means to Solve the Problem

A portable terminal device of the present invention includes: an acceleration detecting section that detects acceleration produced on a main body of the device; a cumulative value calculating section that calculates a cumulative value of detected acceleration; a comparing section that compares the cumulative value with a threshold value; and a control section that controls a corresponding function in accordance with a result of comparison by the comparing section.

According to the portable terminal device of the present invention, if the main body of the device is continuously shaken and the cumulative value of acceleration exceeds the threshold value, the device controls a corresponding function.

BRIEF DESCRIPTION OF THE DRAWINGS

FIG. 1 is a diagram showing an external appearance of a mobile phone in an embodiment of the present invention;

FIG. 2 is a block diagram showing an entire configuration of the mobile phone in the embodiment;

FIG. 3 is a flowchart of a setting process of a security lock mode in the embodiment;

FIG. 4 is a diagram for describing a cancellation process of the security lock mode in the embodiment;

FIG. 5 is a diagram for describing a cancellation process of the security lock mode in a modification example 1;

FIG. 6 is a diagram showing a first example of the partially modified cancellation process in the modification example 1;

FIG. 7 is a diagram showing a second example of the partially modified cancellation process in the modification example 1;

FIG. 8 is a diagram for describing a cancellation process of the security lock mode in a modification example 2;

FIG. 9 is a flowchart of another modification example of the cancellation process in the modification example 2;

FIG. 10 is a diagram for describing a cancellation process of the security lock mode in a modification example 3;

FIG. 11 is a diagram for describing a cancellation process of the security lock mode in a modification example 4; and FIG. 12 is a diagram for describing a cancellation process of the security lock mode in a modification example 5.

However, the drawings are only for purpose of description, and do not limit the scope of the present invention.

BEST MODE FOR CARRYING OUT THE INVENTION

Embodiment of the present invention will be described below with reference to the attached drawings.

In this embodiment, an acceleration sensor 13 is equivalent to an "acceleration detecting section" recited in the claims. In addition, a liquid crystal panel 21 is equivalent to a "notifying section" recited in the claims. Further, a CPU 100 is equivalent to a "control section" recited in the claims.

It is not to be interpreted that the foregoing correspondences between the claims and the embodiment limit the scope of the claims in the present invention to the embodiment.

FIG. 1 is a diagram showing an external appearance of a mobile phone: FIG. 1(a) is a front view of the mobile phone with a second cabinet open; FIG. 1(b) is a side view of the mobile phone in the same state; and FIG. 1(c) is a cross-sectional view of FIG. 1(b) taken along A-A'.

The mobile phone includes a first cabinet 1 and a second cabinet 2. The first cabinet 1 has a numeric key section 11 with a plurality of number and character input keys. The first cabinet 1 has a backlight unit 12 (hereinafter, referred to as "key backlight") behind the numeric key section 11. The key backlight 12 includes an LED as a light source for supplying light to the numeric key section 11. Accordingly, the user can view indications on the keys even in a dark environment.

The first cabinet 1 has an acceleration sensor 13 therein. The acceleration sensor 13 is a triaxial acceleration sensor arranged so as to detect acceleration produced in three directions: X-axis direction, Y-axis direction, and Z-axis direction, as shown in the drawing.

The second cabinet 2 has on a front side thereof a vertically-long rectangular liquid crystal panel 21 with a display plane exposed at the front. The second cabinet 2 has a backlight unit 22 (hereinafter, referred to as "panel backlight") behind the liquid crystal panel 21. The panel backlight 22 has an LED as a light source for supplying light to the liquid crystal panel 21.

The second cabinet 2 also has a main key section 25 on the front side thereof. The main key section 25 includes switch keys for various function modes (camera shooting mode, mail send/receive mode, and Internet mode), a communication start key, a communication end key, and the like.

The second cabinet 2 has a camera module 26 therein. The camera module 26 has a lens window (not illustrated) exposed at a back surface of the second cabinet 2 through which an image of a subject is captured into the camera module 26.

The second cabinet 2 is connected to the first cabinet 1 by a slide mechanism section 3 in such a manner as to be slidable in the X-axis direction shown in FIG. 1. As shown in FIG. 1(*c*), the slide mechanism section 3 is constituted by guide plates 31 and guide grooves 32. The guide plates 31 are arranged on the back surface of the second cabinet 2 at right and left ends, and have projecting streaks 31*a* at lower ends thereof. The guide grooves 32 are formed on side surfaces of the first cabinet 1 along a direction of sliding (in the X-axis direction of FIG. 1). The projecting streaks 31*a* of the guide plates 31 engage with the guide grooves 32.

When the mobile phone is closed, the second cabinet 2 almost completely overlaps the first cabinet 1, as shown by a dashed line in FIG. 1(*b*). In this state (closed state), all the keys of the numeric key section 11 are hidden behind the second cabinet 2. The second cabinet 2 can slide (open) until the guide plates 31 reach ends of the guide grooves 32. When the second cabinet 2 is fully opened, all the keys of the numeric key section 11 are externally exposed as shown in FIG. 1(*a*).

The first cabinet 1 and the second cabinet 2 have an open/close detecting section 4 to detect whether the second cabinet 2 is open or closed. The open/close detecting section 4 is constituted by a close sensor 41 and an open sensor 42 arranged on the first cabinet 1 and a magnet 43 arranged on the second cabinet 2. The magnet 43 is positioned at an end of the second cabinet 2. The close sensor 41 is positioned so as to come close to the magnet 43 when the second cabinet 2 is fully closed. Meanwhile, the open sensor 42 is positioned so as to come close to the magnet 43 when the second cabinet 2 is fully open. The close sensor 41 and the open sensor 42 are formed by MR sensors (magnetoresistance elements), for example, to output detection signals in response to a magnetic force of the magnet 43. When the closed second cabinet 2 is opened, the close sensor 41 outputs an off signal and the open sensor 42 outputs an on signal. In contrast, when the open second cabinet 2 is closed, the open sensor 42 outputs an off signal and the close sensor 41 outputs an on signal.

FIG. 2 is a block diagram showing an entire configuration of the mobile phone. Besides the constitutional elements described above, the mobile phone of this embodiment includes a CPU 100, an image encoder 101, a microphone 102, a voice encoder 103, a timer 104, a counter 105, a communication module 106, a memory 107, a backlight drive circuit 108, an image decoder 109, a voice decoder 110, and a speaker 111.

The camera module 26 is formed by an imaging lens 26*a*, an imaging element 26*b*, and the like. The imaging lens 26*a* forms an image of a subject on the imaging element 26*b*. The imaging element 26*b* is formed by a CCD, for example, to generate an image signal in accordance with a captured image and output the same to the image encoder 101. The image encoder 101 converts the image signal from the imaging element 26*b* into a digital image signal capable of being processed by the CPU 100, and outputs the same to the CPU 100.

The microphone 102 converts an audio signal into an electric signal, and outputs the same to the voice encoder 103. The voice encoder 103 converts the audio signal from the microphone 102 into a digital audio signal capable of being processed by the CPU 100, and outputs the same to the CPU 100.

The timer 104 measures a period of time and outputs the measured value to the CPU 100. The counter 105 counts the number of times and outputs the counted value to the CPU 100.

The communication module 106 converts audio signals, image signals, text signals, and the like from the CPU 100 into radio signals, and transmits the same to a base station via an antenna 106*a*. In addition, the communication module 106 converts radio signals received via the antenna 106*a* into audio signals, image signals, text signals, and the like, and outputs the same to the CPU 100.

The memory 107 includes a ROM and a RAM. The memory 107 stores a control program for providing control functions to the CPU 100. In addition, the memory 107 stores data of images shot by the camera module 26, and image data, text data (mail data), and the like captured externally via the communication module 106, in predetermined file formats.

The memory 107 also stores a plurality of threshold values for authentication to be used in a cancellation process of a security lock mode described later. The CPU 100 acquires one of the plurality of threshold values selected by a user in the user in the cancellation process.

The backlight drive circuit 108 supplies a voltage signal in accordance with a control signal from the CPU 100 to the panel backlight 22 and the key backlight 12.

The image decoder 109 converts the image signal from the CPU 100 into an analog image signal capable of being displayed on the liquid crystal panel 21, and outputs the same to the liquid crystal panel 21.

The voice decoder 110 converts an audio signal from the CPU 100 into an analog audio signal capable of being output from the speaker 111, and outputs the same to the speaker 111. The speaker 111 reproduces an audio signal, as voice, from the voice decoder 110.

The CPU 100 performs processes in various function modes by outputting control signals to components such as the communication module 106, the image decoder 109, the voice decoder 110, in accordance with input signals from components such as the camera module 26, the microphone 102, the main key section 25, the numeric key section 11.

Further, the CPU 100 performs a process for setting a security lock mode, a process for enabling a security lock mode; and a process for canceling the security lock mode.

For the sake of simplicity, FIG. 2 shows a cumulative value calculation process and a comparison process executed by the CPU 100 in the cancellation process of the security lock mode, represented by a cumulative value calculating section 100*a* and a comparing section 100*b*. In addition, FIG. 2 shows a threshold value setting process executed in the setting process of the security lock mode, represented by a threshold value setting section 100c.

The cumulative value calculating section 100a acquires a synthetic acceleration in which components of acceleration detected by the acceleration sensor 13 in three directions: an X-axis direction, a Y-axis direction and a Z-axis direction, are combined, as acceleration produced in a direction of shaking of the mobile phone, and then calculates a cumulative value of this acceleration (hereinafter, referred to as "cumulative acceleration"). The comparing section 100b compares the calculated cumulative acceleration with a threshold value set by the threshold setting section 100c. The threshold value setting section 100c sets a threshold value for cumulative acceleration in accordance with a setting operation performed by a user.

The mobile phone of this embodiment allows a user to set the security lock mode. The security lock mode is a function for prevention of unauthorized use by persons other than a user. In this mode, all key input operations are disabled in principle, except for a few special operations such as making an emergency call to organizations concerned, unless an operation for cancellation is performed. In this embodiment, a cumulative value of acceleration produced on the mobile phone is used as input for authentication to cancel the security lock mode.

The process for setting the security lock mode and the process for canceling the same will be described below.

FIG. 3 is flowchart of the setting process of the security lock mode. The setting process of the security lock mode will be described below with reference to FIG. 3.

The CPU 100 determines whether a user has performed an operation for setting the security lock mode (S101). If the user has performed a key operation for the security lock mode (S101: YES), the CPU 100 sets the security lock mode (S102).

Then, the CPU 100 causes the liquid crystal panel 21 to display a screen for setting an authentication threshold value for use in cancellation of the lock mode (S103). This setting screen shows a plurality of levels of threshold values, for example. In this case, the user can select and set a desired level of threshold value.

The CPU 100 determines whether the user has performed an operation for setting a threshold value (S104). If the user has performed the operation for setting a threshold value (S104: YES), the CPU 100 (threshold value setting section 100c) sets the threshold value selected by the user as a threshold value for use in the canceling process (S105).

Accordingly, when the setting process is completed and after that, for example, the second cabinet 2 is closed, a key lock process of the security lock mode is executed to disable key operations (the keys are locked) thereafter unless the mode is cancelled.

FIG. 4 is a diagram for describing the cancellation process of the security lock mode: FIG. 4(a) is a flowchart of the cancellation process of the security lock mode; and FIG. 4(b) is a diagram showing a relation between a cumulative acceleration $\alpha$ and a threshold value $\beta 1$. The cancellation process of the security lock mode will be described with reference to FIG. 4.

The CPU 100 determines whether the user has performed an operation for canceling the security lock mode (S201). If the user has performed a key operation for cancellation (S201: YES), the CPU 100 makes initial setting (S202). Specifically, the CPU 100 resets the cumulative acceleration $\alpha$ to zero, and acquires the threshold value (setting value) selected by the user from the memory 107 in the setting process, as threshold value $\beta 1$ for this time.

Next, the CPU 100 starts acquisition of acceleration $\alpha 1$ (S203). Subsequently, the CPU 100 (cumulative value calculating section 100a) performs $\alpha = \alpha + \alpha 1$ at each acquisition of the acceleration $\alpha 1$, thereby to calculate the cumulative acceleration $\alpha$ (S204). Then, the CPU 100 (comparing section 100b) compares the calculated cumulative acceleration $\alpha$ with the threshold value $\beta 1$ (S205).

After having performed a first cancellation operation, the user shakes the mobile phone for authentication. When the mobile phone is shaken by the user, the cumulative acceleration $\alpha$ increases and finally exceeds the threshold value $\beta 1$ as shown in FIG. 4(b).

If determining that the cumulative acceleration $\alpha$ has exceeded the threshold value $\beta 1$ (S205: YES), the CPU 100 authenticates cancellation and cancels the security lock mode (S206). Accordingly, the user is allowed to perform key operation thereafter.

If it is determined at step S201 that the user has performed an operation for cancellation, it is desired to make a notification for prompting the user to perform an operation for authentication, by providing an image or a sound through the liquid crystal panel 21 or the speaker 111. In addition, if mode cancellation is performed at step S206, it is also desired to make a notification of completion of the mode cancellation, by providing an image or a sound through the liquid crystal panel 21 or the speaker 111.

According to this embodiment as described above, it is possible to perform an input for authentication only by shaking continuously the mobile phone, which makes an input operation easy for user to perform. In addition, when the threshold value is set high, the cumulative acceleration is less prone to reach the threshold value in situations where the mobile phone is spontaneously shaken. This prevents incorrect input from taking place in response to movements of the portable terminal device without the user's intent.

Further, setting the threshold value high is more effective in preventing occurrence of incorrect input, but requires the user to shake the mobile phone continuously for a long period of time. This may make an input operation troublesome for the user.

In this embodiment, the user can adjust the threshold value. Specifically, the user can set the threshold value high if he or she gives a high priority to an effect of preventing incorrect input. Otherwise, the user can set the threshold value low if he or she places a high priority on ease of input operation, in accordance with the status of use. This improves operability for the user.

Although the foregoing is a description of an embodiment of the present invention, the present invention is not limited by this embodiment. In addition, this embodiment can also be modified in various manners. For example, instead of the cancellation process of the security lock mode in the foregoing embodiment, any of cancellation processes in modification examples 1 to 5 described below can be employed.

Modification Example 1

FIG. 5 is a diagram for describing a cancellation process of the security lock mode in a modification example 1: FIG. 5(a) is a flowchart of the cancellation process; and FIG. 5(b) is a diagram showing relations among the cumulative acceleration $\alpha$, a threshold value $\beta 2$, and a prescribed time Tr.

The modification example 1 is identical to the foregoing embodiment in arrangements other than the cancellation process. The threshold value $\beta 2$ for authentication in this modification example is selected by a user from among a plurality of threshold values stored in the memory 107 in the setting process. The memory 107 also stores the prescribed time Tr.

The cancellation process in the modification example 1 will be described below with reference to FIG. 5.

When the user performs a key operation for cancellation (S301: YES), the CPU 100 makes initial setting (S302). Specifically, the CPU 100 resets the cumulative acceleration α and a time t on the timer 104 to zero. In addition, the CPU 100 acquires the threshold value selected by the user in the setting process, as threshold value β2 for this time from the memory 107. Further, the CPU 100 also acquires the prescribed time Tr from the memory 107.

Next, the CPU 100 starts acquisition of the acceleration α1 (S303). Subsequently, after a lapse of the prescribed time Tr from the start of acquisition (S304: YES), the CPU 100 calculates a total value of the acceleration α1 during the past prescribed time Tr as cumulative acceleration α (S305), and then compares the calculated cumulative acceleration α with the threshold value β2 (S306). Accordingly, after a lapse of the prescribed time Tr, the CPU 100 repeats a series of operations (S303 to S306) at each acquisition of the acceleration α1, so that the acceleration α1 for the past prescribed time Tr is added up from that point of time to calculate the cumulative acceleration α, and the same is compared with the threshold value β2.

After having performed a first cancellation operation, the user shakes the mobile phone for authentication. At that time, as shown in FIG. 5(b), the cumulative acceleration α does not exceed the threshold value β2 while the user shakes the mobile phone slowly, and then the cumulative acceleration α exceeds the threshold value β2 when the user shakes the mobile phone quickly.

If determining that the cumulative acceleration α has exceeded the threshold value β2 (S306: YES), the CPU 100 authenticates cancellation and cancels the security lock mode (S307). Accordingly, the user is allowed to perform key operations thereafter.

According to the arrangement of the modification example 1 as described above, authentication for mode cancellation requires accumulation of acceleration exceeding the threshold value within a prescribed time. That is, restrictions are placed on magnitude of a cumulative value and a period of time for authentication of mode cancellation. Accordingly, it is possible to prevent more reliably incorrect input from occurring in response to movements of the portable terminal device without the user's intent.

In addition, the prescribed time Tr may be selected and set by the user in the setting process, as in the case with the threshold value β2.

In the example of FIG. 5, after a lapse of the prescribed time Tr, the cumulative acceleration α is calculated and compared with the threshold value β2 at each acquisition of the acceleration α1. However, the timing for comparison between the cumulative acceleration α and the threshold value β2 may be changed as described below.

FIG. 6 is a diagram showing a first example of a partly modified cancellation process in the modification example 1: FIG. 6(a) is a flowchart of the cancellation process; and FIG. 6(b) is a diagram showing relations among the cumulative acceleration α, the threshold value β2, and the prescribed time Tr.

In this example, a time axis is split by prescribed time Tr, and the cumulative acceleration α between the prescribed times Tr is compared with the threshold value β2. The cancellation process will be described below.

If the user has performed a key operation for cancellation (S311: YES), the CPU 100 makes initial setting (S312). The initial setting is identical to that in the modification example 1.

Next, the CPU 100 starts acquisition of the acceleration α1, and after that, calculates the cumulative acceleration α at each acquisition of the acquisition α1 until the prescribed time Tr has elapsed (S313 to S315). Then, after a lapse of the prescribed time Tr (S315: YES), the CPU 100 compares the cumulative acceleration α at that point of time with the threshold value β2 (S316).

If determining at step S316 that the cumulative acceleration α has not exceeded the threshold value β2, the CPU 100 resets the cumulative acceleration α and the time t to zero (S317), and then returns the process to step S313. Accordingly, the CPU 100 repeats steps S313 to S317 as far as the CPU 100 determines at step S316 that the cumulative acceleration α has not exceeded the threshold value β2.

Meanwhile, if determining at step S316 that the cumulative acceleration α has exceeded the threshold value β2 (S316: YES), the CPU 100 authenticates cancellation and cancels the security lock mode (S318). Accordingly, the user is allowed to perform key operations thereafter.

In this example, steps S313 to S317 are successively repeated. Alternatively, these steps may be repeated at predetermined intervals.

FIG. 7 is a diagram showing a second example of a partially modified cancellation process in the modification example 1: FIG. 7(a) is a flowchart of the cancellation process; and FIG. 7(b) is a diagram showing relations among the cumulative acceleration α, the threshold value β2, and the prescribed time Tr.

In this example, upon detection of an increase in the acceleration α1, the cumulative acceleration α is calculated within the prescribed time Tr, and the calculated cumulative acceleration α is compared with the threshold value β2. The cancellation process will be described below.

When the user has performed a key operation for cancellation (S321: YES), the CPU 100 makes initial setting (S322). The initial setting is the same as that in the modification example 1.

Then, the CPU 100 starts acquisition of the acceleration α1, and after that, at each acceleration of the acceleration α1, the CPU 100 determines whether the current acceleration α1 is larger than the acceleration α1 acquired a predetermined number of times earlier (S323 and S324).

The CPU 100 repeats steps S323 and S324 as far as the CPU 100 determines that the current acceleration α1 is less than an acceleration α2 a number of several times earlier.

If determining at step S324 that the current acceleration α1 is larger than the acceleration α2 a number of several times earlier, the CPU 100 determines that the acceleration α1 has started to increase. Subsequently, the CPU 100 calculates the cumulative acceleration α at each acquisition of the acceleration α1 until the prescribed time Tr has elapsed (S325 to S327). Then, after a lapse of the prescribed time Tr (S326: YES), the CPU 100 compares the calculated cumulative acceleration α with the threshold value β2 (S328).

If determining at step S328 that the cumulative acceleration α has not exceeded the threshold value β2, the CPU 100 resets the cumulative acceleration α and the time t to zero (S329), and then returns the process to step S323. Accordingly, the CPU 100 repeats steps S323 to S329 as far as the CPU 100 determines at step S328 that the cumulative acceleration α has not exceeded the threshold value β2.

Meanwhile, if determining at step S328 that the cumulative acceleration α has exceeded the threshold value β2 (S328:

YES), the CPU 100 authenticates cancellation and cancels the security lock mode (S330). Accordingly, the user is allowed to perform key operations thereafter.

The acceleration α1 increases when the user starts to shake the mobile phone quickly. In this case, there is a higher possibility that the cumulative acceleration α exceeds the threshold value β2 to allow authentication to be performed. In the arrangement of the second example, it is possible to calculate the cumulative acceleration α and compares the same with the threshold value β2 only with proper timing with which authentication is prone to be performed.

Modification Example 2

FIG. 8 is a diagram for describing a cancellation process of the security lock mode in a modification example 2: FIG. 8(*a*) is a flowchart of the cancellation process; and FIG. 8(*b*) is a diagram showing relations among the cumulative acceleration α, a threshold value β3, and a threshold value γ.

The modification example 2 is identical to the foregoing embodiment in arrangements other than the cancellation process. The threshold values β3 and γ used for authentication in this modification example are selected in the setting process by the user from among a plurality of threshold values stored in the memory 107, as in the case of the threshold value β1.

The cancellation process in the modification example 2 will be described below with reference to FIG. 8.

When the user has performed a key operation for cancellation (S401: YES), the CPU 100 makes initial setting (S402). Specifically, the CPU 100 resets the cumulative acceleration α to zero. In addition, the CPU 100 acquires the threshold values β3 and γ selected by the user in the setting process as threshold values β3 and γ for this time, from the memory 107.

Next, the CPU 100 starts acquisition of the acceleration α1. After that, the CPU 100 repeats a series of processes at each acquisition of the acceleration α to calculate the cumulative acceleration α and compares the calculated cumulative acceleration α with the threshold value β3 (S403 to S405).

Then, if determining that the cumulative acceleration α has exceeded the threshold value β3 (S405: YES), the CPU 100 authenticates cancellation and cancels the security lock mode (S406). Accordingly, the user is allowed to perform key operations thereafter.

Then, the CPU 100 makes a notification of mode cancellation (S407). For example, the CPU 100 causes the liquid crystal panel 21 to pop up an image indicative of mode cancellation. In this case, the image may be intended to not only notify mode cancellation but also prompt the user to perform an operation for confirmation. In addition, such a notification may be made by issuing a sound indicative of mode cancellation from the speaker 111, instead of displaying an image.

After that, the CPU 100 determines whether the user has performed an operation for confirming the cancellation (S408). Then, if determining that the user has performed the confirmation operation (S408: YES), the CPU 100 confirms the mode cancellation (S409) and terminates the cancellation process.

Meanwhile, if determining at step S408 that no confirmation operation has been performed (S408: NO), the CPU 100 determines whether the cumulative acceleration α has exceeded the threshold value γ (S410).

If the user shakes intentionally the mobile phone for authentication, in general, the mobile phone is stopped in response to a notification of mode cancellation and an operation for confirming mode cancellation is performed, and therefore the cumulative acceleration α can hardly exceed the threshold value γ. On the other hand, if the cumulative acceleration α exceeds the threshold value β3 since the mobile phone is spontaneously shaken in a bag or the like, it is conceived that the cumulative acceleration α exceeds the threshold value γ in many cases because the mobile phone is continuously shaken and no operation for confirming mode cancellation is performed.

Accordingly, if the cumulative acceleration α has exceeded the threshold value γ with no confirmation operation performed by the user (S410: YES), the CPU 100 enables again the security lock mode to disable key input (S411).

According to the arrangement of the modification example 2 as described above, even if the cumulative acceleration α exceeds the first threshold value β3 and the security lock is temporarily cancelled, the security lock mode is enabled again when the acceleration is subsequently accumulated and the cumulative acceleration α exceeds the next threshold value γ. Therefore, it is possible to prevent that the canceled state of the security lock mode continues without the user's intent.

Further, according to the arrangement of the modification example 2, mode cancellation is confirmed by the user performing a confirmation operation before the cumulative acceleration α has exceeded the threshold value γ. Accordingly, after that, it is prevented that the security lock mode is undesirably enabled again even if the user moves incidentally the portable terminal device.

Moreover, according to the arrangement of the modification example 2, a notification of mode cancellation is provided to allow the user to perform a confirmation operation in a reliable manner.

The user may perform a confirmation operation through the use of a predetermined key or an arbitrary key. In the case of using an arbitrary key, after setting of mode cancellation, the mode cancellation is confirmed by the user performing a key operation for a function of telephone communication or the like.

In the arrangement of the modification example 2, the mode remains canceled if the user has not performed a confirmation operation after mode cancellation and the cumulative acceleration α has not exceeded the threshold value γ. Accordingly, the cancellation process of the modification example 2 may be provided with an additional step of enabling again the security lock mode after a time limit has been exceeded, as shown in FIG. 9(*a*).

Specifically, after the notification of mode cancellation (S407), if determining that the user has not performed a confirmation operation (S408: NO) and the cumulative acceleration α has not exceeded the threshold value γ (S410: NO), the CPU 100 determines whether a first time limit has been exceeded since the mode cancellation (S412). Then, if determining that the first time limit has been exceeded (S412: YES), the CPU 100 enables again the security lock mode (S411).

In contrast, if determining that the first time limit has not been exceeded (S412: NO), the CPU 100 then determines whether a second time limit (shorter than the first time limit) has been exceeded since stoppage of acceleration (S413). If determining that the second time limit has been exceeded (S413: YES), the CPU 100 enables again the security lock mode (S411).

In such an arrangement, it is possible to prevent the cancellation state from continuing even if the security lock mode has been cancelled without the user's intent and after that the acceleration has been stopped (if the mobile phone has stopped shaking).

Although a period of time elapsed since stoppage of the acceleration is monitored at S413 in the flow of the process shown in FIG. 9(a), this step may be cut out. In this case, if it is determined that the first time limit has not been exceeded since the mode cancellation (S412: NO), the process moves to S407 to perform a re-locking process in accordance with the threshold value γ and the first time limit.

If a confirmation operation is to be performed by a predetermined key as described above, there is a possibility that a time limit may be exceeded while the user performs a desired key operation without performing the confirmation operation. This enables again the security lock mode and interrupts the desired key operation.

Accordingly, if the confirmation operation is to be performed by a predetermined key, the process may be changed as shown in FIG. 9(b).

Specifically, if determining that the cumulative acceleration α has not exceeded the threshold value γ (S410: NO), the CPU 100 then determines whether any key operation (using a key other than the key for confirmation operation) has been performed (S414). If determining that any key operation has been performed (S414: YES), the CPU 100 then determines whether a third time limit has been exceeded since the last key operation (S415). If determining that the third time limit has been exceeded (S415: YES), the CPU 100 enables again the security lock mode (S411).

In contrast, if the first or second time limit has been exceeded (S412: YES, S413: YES) with any key operation not performed (S414: NO), the CPU 100 enables again the security lock mode (S411).

In such an arrangement, while the user is performing a key operation, the security lock mode is not enable again to interrupt the key operation.

These first, second, and third time limits are also stored in the memory 107, and are acquired from the memory 107 in the operation of step S402. In addition, these time limits can be modified by the user in a setting operation.

Modification Example 3

FIG. 10 is a diagram for describing a cancellation process of the security lock mode in a modification example 3: FIG. 10(a) is a flowchart of the cancellation process; and FIG. 10(b) is a diagram showing relations among the cumulative acceleration α, the threshold value β3, and the threshold value γ.

In the modification example 2, mode cancellation is carried out immediately when the cumulative acceleration α has exceeded the threshold value β3. Meanwhile, in the modification example 3, mode cancellation is not carried out immediately even if the cumulative acceleration α has exceeded the threshold value β3. Mode cancellation in this modification example is carried out when the user has finally performed an operation for cancellation. The modification example 3 is identical in steps S401 to S405 to the modification example 2. Therefore, only different steps of the modification example 3 from those of the modification example 2 will be described below.

If determining at step S405 that the cumulative acceleration α has exceeded the threshold value β3, the CPU 100 makes a notification that mode cancellation is enabled (S416). For example, the CPU 100 allows the liquid crystal panel 21 to pop up an image indicating that mode cancellation is enabled (prompting the user to perform an operation for mode cancellation). Alternatively, such a notification of mode cancellation may be provided by issuing a sound from the speaker 111, instead of displaying an image.

After that, the CPU 100 determines whether the user has performed an operation for execution of cancellation (S417). Then, if determining that the user has performed such an operation for execution (S417: YES), the CPU 100 authenticates cancellation and cancels the security lock mode (S418). Accordingly, the user is allowed to perform key operations thereafter.

In contrast, if determining at step S417 that the operation for execution has not been performed (S417: NO), the CPU 100 determines whether the cumulative acceleration α has exceeded the threshold value γ (S419). Then, if the cumulative acceleration α has exceeded the threshold value γ while the user has not performed the operation for execution (S419: YES), the CPU 100 makes a setting for disabling the operation for execution (S420), and then terminates the cancellation process of the security lock mode.

According to the arrangement of the modification example 3, mode cancellation is not executed even if the cumulative acceleration α has exceeded the threshold value β3, as far as the user has not performed an operation for execution of cancellation. Therefore, it is possible to prevent that mode cancellation takes place by the cumulative acceleration α exceeding the threshold value β3 due to shaking of the mobile phone without the user's intent.

Further, according to the arrangement of the modification example 3, it is notified that mode cancellation is enabled to thereby allow the user to perform an operation for execution in a reliable manner.

Modification 4

FIG. 11 is a diagram for describing a cancellation process of the security lock mode in a modification example 4: FIG. 11(a) is a flowchart of the cancellation process; and FIG. 11(b) is a diagram showing relations among the cumulative acceleration α, a threshold value β4, and a prescribed number of times KR.

The modification example 4 is identical to the foregoing embodiment in arrangements other than the cancellation process. The threshold value β4 for use in authentication of this modification example is selected by the user in the setting process from among a plurality of threshold values stored in the memory 107, as in the case of the threshold value β1. The memory 107 also stores the prescribed time TR and the prescribed number of times KR.

The cancellation process in the modification example 4 will be described below with reference to FIG. 11.

When the user has performed a key operation for cancellation (S501: YES), the CPU 100 makes initial setting (S502). Specifically, the CPU 100 resets the cumulative acceleration α, the time t on the timer 104, and the number of executions of authentication k of the counter 105 to zero. In addition, the CPU 100 acquires from the memory 107 the threshold value selected by the user in the setting process as threshold value β4 for this time. Further, the CPU 100 acquires the prescribed time TR and the prescribed number of executions KR from the memory 107.

Next, the CPU 100 starts acquisition of the acceleration α1 (S503). After that, the CPU 100 calculates the cumulative acceleration α at each acquisition of the acceleration α1 (S504). If the prescribed time TR has not elapsed (S505: NO), the CPU 100 compares the calculated cumulative acceleration α with the threshold value β4 (S506).

Then, if the cumulative acceleration α has exceeded the threshold value β4 before a lapse of the prescribed time TR (S506: YES), the CPU 100 increments by one the number of executions of authentication k of the counter 105 (S507), and determines whether the number of executions of authentication k has reached the prescribed number of times KR (S508).

If determining at step S508 that the cumulative acceleration α has not exceeded the threshold value β4, the CPU 100 resets the cumulative acceleration α and the time t to zero (S510), and then returns the process to step S503. Accordingly, the CPU 100 repeats steps S503 to S510 as far as the CPU 100 determines at step S508 that the number of executions of authentication k has not reached the prescribed number of times KR.

If the user shakes the mobile phone slowly and the cumulative acceleration α has not reached the threshold value β4 within the prescribed time TR, the CPU 100 determines at step S505 that the prescribed time TR has elapsed. Accordingly, the CPU 100 moves the process to step S510 without incrementing the number of executions of authentication k, thereby resetting the cumulative acceleration α and the time t to zero.

If the user continue to shake the mobile phone quickly, the number of executions of authentication k increases and finally reaches the prescribed number of times KR (three, for example), as shown in FIG. 11(b).

If determining at step S508 that the number of executions of authentication k has reached the number of times KR (S508: YES), the CPU 100 authenticates cancellation and cancels the security lock mode (S509). This allows the user to perform key operations thereafter.

According to the arrangement of the modification example 4 as described above, it is required that accumulation of acceleration exceeding the threshold value β4 within the prescribed time TR is accumulated by the number of times TR for authentication of mode cancellation. That is, restrictions are placed on a period of time and the number of times as conditions for authentication. Therefore, it is possible to prevent more effectively incorrect input from occurring in response to movements of the portable terminal device without the user's intent.

In the arrangement of the modification example 4, there may be no time limit set by the prescribed time TR without measurement of the time t. In this case, regardless of a period of time, the number of executions of authentication k is incremented and the cumulative acceleration α is reset each time the cumulative acceleration α exceeds the threshold value β3. Then, when the number of executions of authentication k has reached the number of times KR, mode cancellation is carried out.

Even in such an arrangement, there is at least a limit on number of times, which makes it possible to prevent more reliably incorrect input from occurring in response to movements of the portable terminal device without the user's intent.

Modification Example 5

FIG. 12 is a diagram for describing the cancellation process of the security lock mode in a modification example 5: FIG. 12(a) is a flowchart of a first example of the cancellation process; FIG. 12(b) is a diagram showing relations among the cumulative acceleration α, a threshold value β5, and a threshold value D; and FIG. 12(c) is a flowchart of a second example of the cancellation process.

In general, the acceleration of the spontaneously shaking mobile phone is considered as smaller than that of the mobile phone shaken intentionally by the user. Accordingly, in the modification example 5, acceleration is not accumulated if the mobile phone is shaken subtly.

In addition, if the threshold value is set high, the user may be tired and stop shaking the mobile phone even if the cumulative acceleration almost reaches the threshold value. Accordingly, in the modification example 5, when the cumulative acceleration comes close to the threshold value, a notification is provided to inform the user that the input operation is nearly completed.

The modification example 5 is identical to the foregoing embodiment in arrangements other than the cancellation process. The threshold value β5 for use in authentication of this modification example is selected by the user in the setting process from among a plurality of threshold values stored in the memory 107, as in the case of the threshold value β1. In addition, the memory 107 also stores a reference value α0 and the threshold value D.

The cancellation process in the modification example 5 will be described below with reference to FIG. 12.

When the user has performed a key operation for cancellation (S601: YES), the CPU 100 makes initial setting (S602). Specifically, the CPU 100 resets the cumulative acceleration α to zero. In addition, the CPU 100 acquires from the memory 107 the threshold value selected by the user in the setting process as threshold value β5 for this time. Further, the CPU 100 acquires the reference value α0 and the threshold value D from the memory 107.

Next, the CPU 100 starts acquisition of the acceleration α1 (S603), and compares the acquired acceleration α1 with the reference value α0 at each acquisition of the acceleration α1 (S604). In addition, if the acceleration α1 has exceeded the reference value α0 (S604: YES), the CPU 100 accumulates the acceleration α1 to calculates the cumulative acceleration α (S605), and then compares the calculated cumulative acceleration α with the threshold value β5 (S606).

If the user shakes the mobile phone actively for authentication, acceleration generally becomes high and thus the detected acceleration α1 exceeds the reference value α0 in most cases, which allows the cumulative acceleration α to finally exceed the threshold value β5. If the mobile phone is shaken spontaneously, the acceleration α1 does not become so high and hardly exceeds the reference value α0, which scarcely increases the cumulative acceleration α.

If determining at step S606 that the cumulative acceleration α has exceeded the threshold value β5 (S606: YES), the CPU 100 authenticates cancellation and cancels the security lock mode (S607). This allows the user to perform key operations thereafter.

In contrast, if determining at step S606 that the cumulative acceleration α has not exceeded the threshold value β5 (S606: NO), the CPU 100 calculates a difference Δα between the threshold value β5 and the cumulative acceleration α at a point of time (S608). Then, the CPU 100 compares the difference Δα with the threshold value D (S609). If the difference Δα is smaller than the threshold value D (S609: YES), the CPU 100 determines that the difference Δα has come close to the threshold value β1, and then informs the user that an input operation is nearly completed by issuing a sound from the speaker 111 or the like (S610).

According to the arrangement of the modification example 5 as described above, if the mobile phone shakes subtly, the acceleration is not accumulated. Accordingly, it is possible to prevent more reliably incorrect input from occurring in response to movements of the portable terminal device without the user's intent.

In addition, according to the arrangement of the modification example 5, the user is informed that an input operation is nearly completed, which makes it possible to prevent that the user gives up the almost completed input operation.

The reference value α0 and the threshold value D can be changed by a user in a setting operation.

If the user continues to shake actively the mobile phone without intention to stop shaking, the foregoing notification may be a rather annoying sound to the user. Accordingly, apart of the process of FIG. 12(a) can be modified as shown in FIG. 12(c).

In this example, when the difference Δα is smaller than the threshold value D (S609: YES), if the CPU 100 determines that the acceleration α1 is stopped (S611: YES) and the user almost gives up shaking, the CPU 100 notifies that the input operation is nearly completed (S610). In this arrangement, a notification is provided only when necessary, which prevents the notification from annoying the user.

In this example, the notification can be provided even if the acceleration α1 is not completely stopped but is nearly stopped (smaller than a threshold value).

The notification at S608 to S610 shown in FIG. 12(a) or at S608 to S611 shown in FIG. 12(c) can also be added as appropriate to the process flows shown in FIGS. 4, 8, and 10. For example, in the process flow of FIG. 4(a), if the determination result is NO at S205, the notification is executed and upon completion of the notification, the process moves to S203. In the process flows of FIGS. 8(a) and 10(a), if the determination result is NO at S405, the notification is executed and upon completion of the notification, the process moves to S403.

Further, the acceleration determination at S604 can also be added as appropriate to the process flows shown in FIGS. 4, 6, 8, 10, and 11. In this case, the acceleration determination is added as a subsequent part to the process for acquiring the acceleration α1 (at S203, S313, S403, and S503). In addition, in the process flow of FIG. 5, the acceleration determination of S604 may be carried out at S305 so that only accelerations α1 exceeding the reference value α0 are added up as acceleration α1 for the past prescribed time Tr.

<Others>

The embodiment of the present invention can be modified in various manners other than described above.

In the arrangements of the foregoing embodiment and the modification examples, if the user has first performed an operation for cancellation and after that a predetermined time limit has been exceeded with no authentication in accordance with the cumulative acceleration, the cancellation process of the security lock mode may be terminated. In this case, the time limit is desirably determined in accordance with a period of time generally required for the user to perform an operation for authentication.

In addition, in the arrangements of the foregoing embodiment and the modification examples, when the security lock mode (lock mode) is set, an indication can be provided on the display surface of the liquid crystal panel 21 to inform the user that the security lock mode is enabled. For example, it is possible to display a specific icon (a mark of a key, for example) on the display surface of the liquid crystal panel 21. In addition, when the user performs an operation for authentication by shaking the mobile phone (measuring the cumulative acceleration), it is possible to provide an indication of that effect on the display surface of the liquid crystal panel 21. For example, the foregoing icon can be changed in color or configured to blink.

Further, in the foregoing embodiment and the modification examples, the security lock function is controlled in accordance with cumulative acceleration as described above. However, the present invention is not limited by this arrangement, and any other function may be controlled in accordance with cumulative acceleration.

For example, instead of the security lock mode for disabling all keys in principle, any other lock function such as a lock mode for disabling only a key for a specific capability, may be controlled in accordance with cumulative acceleration.

Besides, any other function can be controlled in accordance with cumulative acceleration. For example, if cumulative acceleration has exceeded a threshold value, the mobile phone may be switched from a standby state (monitor display is off) to an operational state (monitor display is on). In addition, if cumulative acceleration has exceeded a threshold value, a predetermined application for television and the like may be activated. Further, if cumulative acceleration has exceeded a threshold value, a pattern of a background image (wall paper) on a standby screen may be changed.

In the foregoing embodiment, the acceleration sensor 13 is a triaxial acceleration sensor. Alternatively, the acceleration sensor 13 is not limited to this, and may be a biaxial acceleration sensor or a uniaxial acceleration sensor. Using the triaxial acceleration sensor allows detection of acceleration produced on the mobile phone with highest accuracy, but causes higher component costs as compared with those for the biaxial acceleration sensor and the uniaxial acceleration sensor. Accordingly, it is desired to select the type of the acceleration sensor as appropriate, depending on detection accuracy and component costs required at development.

Further, the portable terminal device of the present invention is not limited to a mobile phone, and may be a personal digital assistant (PDA).

Besides, the embodiment of the present invention can be modified as appropriate in various manners within the scope of the technical idea recited in the claims.

What is claimed is:

1. A portable terminal device, comprising:
   an acceleration detecting section that detects acceleration produced when a user shakes the portable terminal device as an input operation;
   a comparing section that compares the acceleration detected by the acceleration detecting section with a threshold value;
   a counter that counts the number of times the acceleration detected by the acceleration detecting section has exceeded the threshold value in accordance with a result of comparison by the comparing section;
   a display section that displays a notification to inform the user that the user is performing the input operation; and
   a control section that controls a corresponding function when the number of times counted by the counter has reached a prescribed number of times.

2. The portable terminal device according to claim 1, wherein
   the input operation is an operation for authentication.

3. The portable terminal device according to claim 1, wherein
   the control section cancels a lock function for disabling key operations as the control of the corresponding function.

4. The portable terminal device according to claim 1, wherein
   the control section switches an display on the display section from an off state to an on state as the control of the corresponding function.

5. The portable terminal device according to claim 1, wherein
   the control section changes an image on a standby screen displayed on the display section as the control of the corresponding function.

6. A non-transitory storage medium for storing a program, the program providing a computer of a portable terminal device including an acceleration detecting section, a display section, and a counter with functions of:

comparing acceleration detected by the acceleration detecting section with a threshold value, the acceleration being produced when a user shakes the portable terminal device as an input operation;

causing the counter to count the number of times the acceleration detected by the acceleration detecting section has exceeded the threshold value;

causing the display section to display a notification to inform the user that the user is performing the input operation; and controlling a corresponding function when the number of times counted by the counter has reached a prescribed number of times.

7. A control method of a portable terminal device including an acceleration detecting section that detects acceleration produced when a user shakes the portable terminal device as an input operation, a display section, and a counter, the method comprising steps of:

comparing acceleration detected by the acceleration detecting section with a threshold value, the acceleration being produced when a user shakes the portable terminal device as an input operation;

causing the counter to count the number of times the acceleration detected by the acceleration detecting section has exceeded a threshold value, and the display section to display a notification to inform the user that the user is performing the input operation; and controlling a corresponding function when the number of times counted by the counter has reached a prescribed number of times.

* * * * *